ns
3,271,440
AMINO-BENZOIC AND AMINO-TOLUIC ACID
DIESTERS OF POLYHYDRIC ALKANOLS
Telfer L. Thomas, Belleville, N.J., assignor to General
Aniline & Film Corporation, New York, N.Y., a corporation of Delaware
No Drawing. Filed Oct. 9, 1962, Ser. No. 229,481
6 Claims. (Cl. 260—471)

This invention relates to novel diesters of polyhydric alcohols which are useful as intermediates for the preparation of disazo dyestuffs, and to a method for preparation of said diesters.

The novel compounds of this invention are aminobenzoic and aminotoluic acid diesters of the polyhydric alcohols of 2 to 6 carbon atoms having the general formula

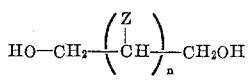

wherein Z represents a member of the group consisting of H and OH and $n$ represents a whole number from 0 to 4 inclusive, the amino groups of the esterifying acids occupying one of the positions meta and para to the esterified carboxyl group.

The novel esters of the invention may be represented by the following general formula

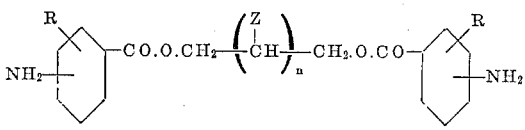

wherein Z represents a member of the group consisting of H and OH, R represents a member of the group consisting of nuclear H and $CH_3$, and the amino groups occupy one of the positions meta and para to the —CO—O group.

Preparation of the novel compounds of the invention is conveniently effected by mixing about 2 mols of meta- or para-nitrobenzoylchloride or -bromide or the corresponding nitro toluic acid chlorides or bromides with 1 mol of a polyhydric alcohol of the formula specified above, together with an excess of acid-binding agent in an otherwise non-reactive medium. Tertiary nitrogen bases are especially advantageous for the latter purposes, serving not only as acid-binding agents but also as otherwise non-reactive solvent media. Such bases are, for example, pyridine, methylpyridines, N-methylpiperidines, trimethylamine and the like. Alternatively inert solvents such as N-methyl-pyrrolidone or N,N-dimethylformamide can be employed, together with an alkali- or alkaline earth metal carbonate as the acid-binding agent.

The solvent medium is preferably used in an amount from 5 to 50 times the amount by weight of the polyhydric alcohol. The acid-binding agent—if other than the solvent medium—can be used in amounts from 1½ to 2½ times the stoichiometric equivalent of the nitrobenzoyl (or nitrotoluic acid) halide employed as the esterifying reagent.

Esterification is carried out under conditions tending to maintain a moderate rate of reaction throughout. For this purpose it is advantageous to bring the reagents together at relatively low temperature e.g. —10 to 25° C., maintaining such temperature by cooling if necessary during initial stages of the reaction, and then completing the esterification by heating to a final temperature of 75 to 125° C.—especially at a reflux temperature within this range. Esterification is ordinarily complete after heating at the aforesaid final temperature for 1 to 6 hours.

The bis-nitrobenzoic (or -toluic) acid ester contained in the reaction mixture can be recovered by filtering, evaporating the solvent, and recrystallizing from alcohol. However, the separation of the nitro-ester from the esterification mixture is unnecessary for conversion thereof to the corresponding amino-ester. For this purpose, when esterification is complete, a reducing agent is advantageously added, such agent being preferably an alkali metal hydrosulfide. Alternative reducing agents include hydrogen sulfide, neutral alkali metal sulfides, as well as mixtures of hydrochloric acid with finely divided hydrogen-liberating metals, such as zinc or iron. A preferred method involves slowly adding, over a period of ½ to 3 hours, to the mixture containing the bis-nitro-ester, an alcoholic solution of an alkali metal hydrosulfide e.g. (in ethanol or methanol) in a quantity somewhat in excess of that required for reduction of the bis-nitro-ester. For example, about 1¼ to 2 parts by weight of sodium hydrosulfide is appropriately employed for each part by weight of nitrobenzoyl or nitrotoluic acid chloride used in the esterification. The quantity of alcohol can range appropriately from 2 to 4 times the weight of alkali metal hydrosulfide.

After addition of the alkali metal hydrosulfide solution, the mixture is heated for about 1 to 6 hours at 80° to 100° C.—preferably under reflux—and then cooled and filtered. The solution may be treated with decolorizing charcoal or similar decolorizing agent and after filtration, the product recovered by evaporating the solvents, and recrystallizing the residue from ethanol or methanol.

Alternatively, after evaporating the solvents, water can be added, together with sufficient strong mineral acid (e.g. hydrochloric acid) to render the solution acid to Congo red. Upon evaporation, the amino acid ester is recovered in the form of a mineral acid salt which crystallizes from the concentrated aqueous solution. The free amino benzoic acid ester can be liberated from the mineral acid salt by treatment with a stoichiometric equivalent of an acid binding agent such as sodium carbonate, calcium carbonate or the like.

Still another alternative involves drowning the decolorized and filtered reduction mixture in cold aqueous alkali, and recovering the bis-amino-ester (which is thereby precipitated) by filtration and washing of the filter cake with water.

My invention will be more fully understood from the following examples wherein parts and percentages are by weight unless otherwise indicated.

*Example 1*

10 grams of ethyleneglycol are dissolved in 200 ml. of pyridine. The resulting solution is added to a solution of 54.6 grams of m-nitrobenzoyl chloride in 100 ml. pyridine and the combined solutions are heated to boiling under reflux for five hours. The mixture is then cooled to 85–90° C. and a solution of 75 grams of sodium hydrosulfide in 200 ml. ethanol is added drop-wise over a period of about one hour. The solution is then heated at 90° C. for an additional two hours, cooled to 40° C. and filtered. The solution is allowed to stand three days during which further reduction occurs. At the end of this period the solution is again filtered and evaporated to dryness, yielding ethyleneglycol bis(m-amino benzoate) as a yellow solid in a yield approximating 95% of theory.

*Example 2*

The same procedure is employed as in Example 1 except that 54.6 grams of p-nitrobenzoyl chloride are substituted for the m-nitrobenzoyl chloride of the first example. Ethyleneglycol bis(p-amino benzoate) is obtained as a yellow product in yields of the order of 90% of theory.

*Example 3*

15.2 grams of erythritol are dissolved in 300 ml. of pyridine and the solution cooled to 0 to 10° C. To this solution there are added with vigorous stirring 46.5 grams of p-nitrobenzoyl chloride dissolved in 300 ml. of pyridine. The reaction mixture is allowed to come to room temperature gradually overnight. The mixture is then heated to 85–90° C. and a solution of 75 grams of sodium hydrosulfide dissolved in 200 ml. of ethanol is added drop-wise over a period of about one hour. The temperature is maintained at 90° C. for two hours and the mixture then filtered. Evaporation of the resulting solution yields erythritol bis(p-amino benzoate) as a yellow solid having the following formula:

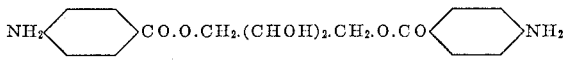

*Example 4*

The procedure of Example 1 is repeated except that 54.6 grams of m-nitrobenzoyl chloride is replaced by 60 grams of 4-nitro-m-toluic acid chloride. Ethyleneglycol bis(4-amino-m-toluic acid ester) is obtained as a product having properties similar to those of the ester obtained in Example 1.

*Example 5*

Example 3 is repeated except that 11.5 grams of glycerine are substituted for the 15.2 grams of erythritol and an equal amount of m-nitrobenzoyl chloride is substituted for the quantity of p-nitrobenzoyl chloride of Example 3. Glycerol bis(m-amino benzoate) is obtained as a product resembling the ester of Example 3. Its formula is as follows:

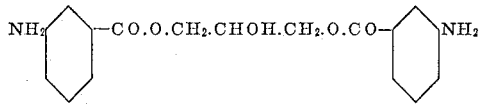

*Example 6*

Example 3 is repeated except that 23.3 grams of mannitol are substituted for the 15.2 grams of erythritol of Example 3. Mannitol bis(p-amino benzoate) is obtained in the form of a yellow solid having the following formula:

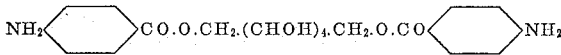

*Example 7*

Example 1 is repeated except that 19 grams of hexamethylene glycol are substituted for the ethyleneglycol of Example 1, and 60 grams of 4-nitro-m-toluic acid chloride are substituted for the 54.6 grams of m-nitrobenzoyl chloride of the first example. The yellow solid obtained as a product is hexamethyleneglycol bis(p-amino-m-toluic acid ester).

Polyhydric alcohols which can be converted to the corresponding aminobenzoic or aminotoluic acid esters are the following:

ethylene glycol
trimethylene glycol
tetramethylene glycol
pentamethylene glycol
hexamethylene glycol
glycerol
erythritol
arabitol
mannitol Acid chlorides or bromides suitable for preparation of esters in accordance with the invention as illustrated in the example are those of the following acids:

m-nitrobenzoic acid
p-nitrobenzoic acid
3, 4 and 5-nitro-o-toluic acids
4-nitro-m-toluic acid
3-nitro-p-toluic acid The bis aminobenzoic and-toluic esters of the invention are useful as intermediates for the preparation of disazo dyes. Thus in order to prepare disazo dyestuff from the bis aminobenzoic ester of Example 1, a solution containing the product—instead of evaporating to dryness—is rendered strongly acid by addition of concentrated hydrochloric acid. The resulting solution is cooled to 0 to 5° C. and filtered. 10 grams of sodium nitrite in the form of a 38% aqueous solution are added to the filtrate to effect tetrazotization. After slurrying for one hour, the solution of the tetrazotized diamino ester is added to a solution of 24 grams of 2,5-dimethoxy aniline in 200 ml. of 1:10 concentrated hydrochloric acid in water. The mixture is agitated overnight, filtered, the filter cake washed with water and dried. The disazo dyestuff thus obtained in yields of the order of 70% of theory, dyes polyacrylonitrile fiber in orange shades having excellent fastness to light. The esters prepared in the other examples can be similarly tetrazotized and coupled to produce disazo dyes having similarly useful properties.

Variations and modifications which will be obvious to those skilled in the art can be made in the foregoing procedure and examples without departing from the scope or the spirit of the invention.

I claim:

1. A compound of the formula:

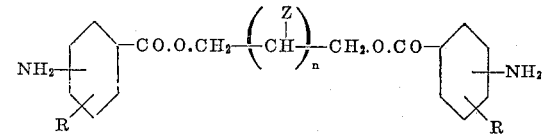

wherein Z represents a member of the group consisting of H and —OH, R represents a member of the group consisting of H and —CH$_3$, $n$ represents an integer from 0 to 4 inclusive and the amino groups occupy one of the positions in the benzene nucleus meta and para to the —CO—O— group.

2. Ethylene glycol bis-m-amino benzoate.
3. Erythritol bis-p-amino benzoate.
4. Hexamethylene glycol bis-p-amino-m-toluic acid ester.
5. Glycerol bis-m-amino benzoate.
6. Mannitol bis-p-amino benzoate.

References Cited by the Examiner

UNITED STATES PATENTS 3,022,268   2/1962   Armitage et al. _____ 260—471
3,060,221   10/1962  Thomas _____ 260—471

OTHER REFERENCES

Uchimi et al., Chem. Abstracts, vol. 53, page 22765 (1959).

LORRAINE A. WEINBERGER, *Primary Examiner.*

IRVING MARCUS, D. D. HORWITZ, *Examiners.*

A. D. ROLLINS, VIVIAN GARNER,
*Assistant Examiners.*